United States Patent [19]

Beggs et al.

[11] 4,179,278
[45] Dec. 18, 1979

[54] METHOD FOR REDUCING PARTICULATE IRON OXIDE TO MOLTEN IRON WITH SOLID REDUCTANT

[75] Inventors: Donald Beggs; David C. Meissner, both of Charlotte, N.C.

[73] Assignee: Midrex Corporation, Charlotte, N.C.

[21] Appl. No.: 892,564

[22] Filed: Apr. 3, 1978

Related U.S. Application Data

[63] Continuation-in-part of Ser. No. 769,242, Feb. 16, 1977, Pat. No. 4,082,543.

[51] Int. Cl.² .............................................. C21C 5/52
[52] U.S. Cl. ........................................... 75/11; 75/25
[58] Field of Search ............................... 75/11, 25, 34

[56] References Cited

U.S. PATENT DOCUMENTS

| | | | |
|---|---|---|---|
| 2,978,315 | 4/1961 | Schenck et al. | 75/11 |
| 3,460,934 | 8/1969 | Kelmar | 75/25 |

Primary Examiner—M. J. Andrews
Attorney, Agent, or Firm—Ralph H. Dougherty

[57] ABSTRACT

A method for reducing particulate iron oxide to molten iron utilizing solid carbonaceous fuel as reductant in a shaft type reducing furnace, in which a furnace burden is formed of a mixture of iron oxide lumps or pellets and particulate solid fuel. Reacted top gas is upgraded and recirculated through the burden in counter-flow relationship thereby heating, reducing and melting the burden. The heat for reduction and melting is generated by passing electric current through the burden.

7 Claims, 1 Drawing Figure

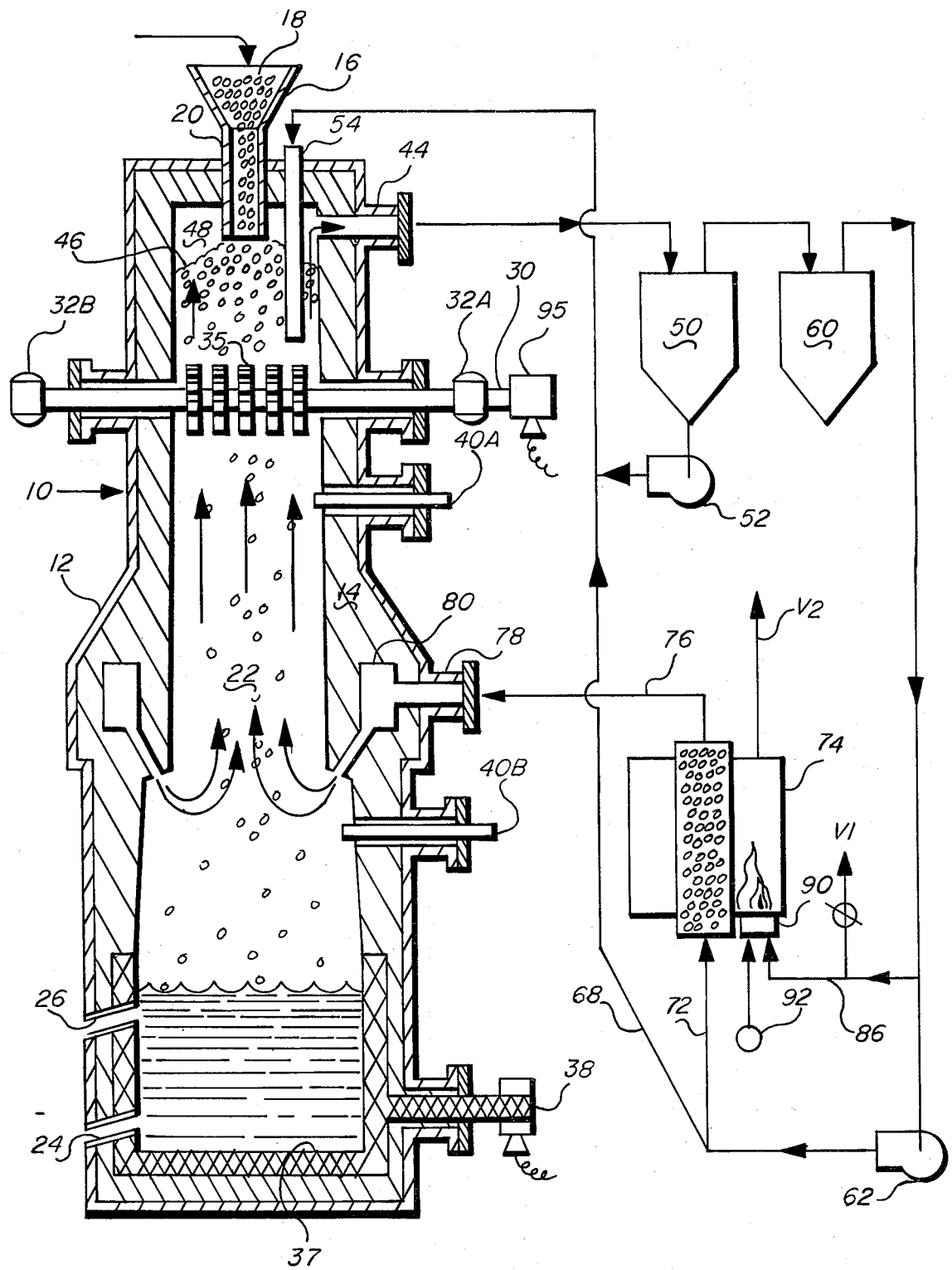

METHOD FOR REDUCING PARTICULATE IRON OXIDE TO MOLTEN IRON WITH SOLID REDUCTANT

CROSS REFERENCE TO RELATED APPLICATION

This application is a continuation-in-part application of U.S. patent application Ser. No. 769,252, filed Feb. 16, 1977 now U.S. Pat. No. 4,082,543.

BACKGROUND OF THE INVENTION

In recent years the direct reduction of iron oxide to metallic iron has become a practical commercial reality with increasing worldwide acceptance and production. The direct reduced iron which results from direct reduction of iron oxide has a commercially demonstrated utility in iron and steelmaking and particularly in electric arc furnace steelmaking.

Direct reduced iron, which is sometimes known as sponge iron, is not suited as the principal feed material for steelmaking furnaces other than electric arc furnaces. Other steelmaking processes such as the basic oxygen process and the bottom blown oxygen process require large quantities of hot metal, or molten metal as feed material. Thus, for oxygen furnace feed, it is desired to produce a molten product from a direct reduction furnace.

A known type process gasifies solid fuel in a separate combustion-type gasifier utilizing oxygen and steam for gasification. The gas from the gasifier is then cooled and scrubbed, desulfurized, then utilized in a direct reduction furnace as the source of reductant. An example of this combination of gasifier and direct reduction furnace is described in U.S. Pat. No. 3,844,766. This combination also has a fundamental thermal disadvantage in that approximately 50 percent of the solid fuel is consumed by combustion in the gasifier and only the remaining 50 percent of the fuel value is available as a source of reductant. This combination, although highly efficient in the use of the gas from the gasifier for reduction, requires approximately 4.0 to 5.0 Giga calories of solid fuel per metric ton of solid direct reduced iron product.

An electrically operated vertical shaft furnace is taught by U.S. Pat. No. 1,937,064 in which broken coke, graphite, silicon carbide or other conductors are charged to form a burden. Molten metal is then poured through the burden while electrical current also flows through the burden, thus refining the molten metal. The burden is a stationary granular mass of carbonaceous material which does not flow through the furnace. The burden also is not the material being treated, unlike the present invention.

Langhammer U.S. Pat. No. 3,894,864 purports to teach a shaft furnace for producing molten steel by use of an electric arc. The patent fails to explain the completion of the electric circuit which creates the electric arc. Applicants distinguish from this process by utilizing direct resistance heating of their burden, unlike any known reference, as well as by recirculating spent top gas to act as reductant source.

Other patents which may be of interest to the reader include Elvander et al U.S. Pat. No. 3,948,640 and Gross U.S. Pat. No. 3,948,642.

OBJECTS OF THE INVENTION

It is the principal object of the present invention to provide a method for directly reducing iron oxide to molten iron in a shaft type reduction furnace wherein solid fuel is utilized as the reductant source.

It is another object of this invention to provide a method for directly reducing iron oxide to molten iron in a shaft furnace wherein the energy input requirements are greatly reduced over present commercial direct reduction methods.

It is another object of this invention to provide means for more efficient operation of a direct reduction shaft furnace than was heretofore possible.

SUMMARY OF THE INVENTION

The present invention is a direct reduction method utilizing solid fuel in a novel and highly thermally efficient manner wherein the solid fuel is consumed directly in the reduction process by reaction with oxygen from the iron oxide which is being reduced. The overall reactions in the furnace are endothermic, the heat required being supplied by electrically heating the burden. Exclusion of an external source of air or industrial oxygen results in a solid fuel requirement of approximately 2.2 Giga calories per metric ton of direct reduced iron product with an additional electric energy requirement of approximately 700 kWh (0.6 Giga calories) per metric ton of direct reduced iron in the solid state, with an additional 200 kWh to further heat and melt the direct reduced iron and gangue.

BRIEF DESCRIPTION OF THE DRAWING

The present invention will be more readily understood by referring to the following detailed specification and the appended drawing in which:

The single FIGURE is a schematic cross section of an elevational view of the shaft furnace of the present invention and related equipment.

DETAILED DESCRIPTION

Referring now to the drawing, a shaft type furnace 10 having a steel shell 12 is lined with refractory 14. a feed hopper 16 is mounted at the top of furnace 10 for charging of particulate solids feed material 18 therein. The feed material consists of iron oxide in the form of pellets or lumps, solid carbonaceous fuel and limestone. The feed material descends by gravity through one or more feed pipes 20 to form a packed bed 22 of particulate solids feed material or burden in the furnace 10. Reduced molten product is removed from the furnace through taphole 24. If desired, a slag taphole 26 can be provided at a higher elevation. Removal of the molten iron and slag establishes a gravitational flow of the particulate burden 22 through shaft furnace 10.

The furnace 10 is preferably cylindrical but could have any desired cross-section.

The upper region of the furnace is provided with at least one heat resistant alloy electrode 30, which extends through the steel furnace shell 12 and across the furnace width. This electrode may be fixed or journaled for rotation in bearings 32A and 32B which may be mounted externally as shown, or insulated and mounted in the furnace walls 14. Each electrode rod may be equipped with one or more heat resistant alloy discs 35 to provide an extended electrode surface area. The number of electrode rods employed is dependent upon the horizontal dimensions of the furnace. The bottom of the shaft furnace is a closed hearth lined with carbon block 37, which enables the entire hearth to act as an electrode. This carbon block hearth is connected to a source of electricity through electrode buss 38. Suitable thermocouples such as 40A and 40B are inserted into the furnace through the refractory wall at selected elevations to assist in controlling the operation of the process.

Top gas exits the furnace through a top gas outlet pipe 44 located above stock line 46. The lower end of feed pipe 20 extends below outlet pipe 44, which arrangement creates a top gas disengaging plenum 48 which permits the top gas to exit generally symmetrically from the stock line 46 and flow freely to the top gas outlet pipe 44.

A gas cleaning and recirculating circuit is provided to remove solids and condensible matter from the top gas and to cool the gas to form cold process gas. The reacted top gas leaving the shaft furnace 10 through pipe 44 flows to an oil scrubber 50 wherein tars, oils, and particulates are removed from the gas as a sludge. Pump 52 pumps the sludge back to the furnace through sludge injection pipe 54 which has an open lower end extending well beneath the stock line 46 to insure reaction of sludge components with the burden and to prevent top gas from recycling these components back into the oil scrubber.

The top gas passes from the oil scrubber 50 to a water scrubber 60 wherein the gas is further cooled and cleaned. A gas recirculating blower 62 draws the cooled and cleaned process gas from the scrubber 60. A portion of the process gas is introduced to pipe 68 to assist in injecting the sludge into the shaft furnace burden. Some process gas must normally be vented because when solid carbon in the furnace reacts with oxygen from the iron oxide, carbon monoxide gas and carbon dioxide gas are formed. Since this reaction involves a gaseous expansion, excess gas may be vented through vent V1. Of course, this excess gas provides a source of energy for use elsewhere.

A second portion of the process gas passes through pipe 72 into gas preheater 74 wherein the gas is heated to reducing temperature of about 900° to 1000° C. The heated gas flows through pipe 76 and is introduced to the furnace through hot process gas inlet 78 and bustle 80. Another portion of the process gas is fed into pipe 86 as fuel for preheater burner 90. Combustion air from the burner 90 is provided by air source 92.

One or more electrodes 30 are provided, depending upon the dimensions of the horizontal cross-section of the furnace. The electrode acts as a feeder mechanism as well as a cluster breaker for material in the upper zone of the furnace. The electrode can carry one or more radially extending breaker segments 35 and can be connected to and driven by oscillatible drive mechanism 95. Each cluster breaker segment extends only about 180 to 270 degrees about the electrode, or it may extend completely around the electrode. Thus, as the electrode oscillates within the bearings, it acts as both a feed mechanism and cluster breaker mechanism. It feeds material alternately by moving material downwardly from opposite walls of the furnace while simultaneously breaking any clusters of the hot cohesive material.

In the method of this invention, iron oxide pellets, lump ore or other suitable iron oxide feed material is mixed with solid carbonaceous fuel such as coal, coke, or lignite and limestone, then fed through feed pipe 20 to the interior of the furnace 10 to form burden 22 therein as a packed bed.

The furnace is heated electro-thermally by passing electric current through the burden between the hearth electrode 37 and the upper alloy electrode 30 in the furnace. Directly reduced iron pellets or lumps are electrically conductive even at the earliest stage of reduction when metallic iron is formed only on the pellet surface. When starting up operation of the electric powered shaft furnace of the present invention, the furnace is charged with reduced or partially metallized directly reduced iron pellets, petroleum coke or any other electrically conductive material. Other conductive materials are utilized when reduced or partially metallized pellets are not available. It has been determined that pellets with metallizations as low as 6 percent are conductive.

The shaft furnace includes three distinct process zones. The upper region constitutes a prereduction zone in which the burden is heated by convection of gases moving in counter-flow relation to the flow of the burden. Coal or other carbonaceous fuel in the feed liberates condensible and noncondensible volatiles. The noncondensible volatiles, which are mostly hydrogen or hydrocarbons, exit as top gas, are cleaned and recirculated as process gas. The pellet burden acts as a moving packed bed pebble quench which is very effective in preventing heavy liquid compounds from plugging gas outlet pipes. Some heavy oils and tars tend to weep out of the coal and are absorbed by the oxide feed to subsequently react with $CO_2$ and water vapor in the process gas. A high ratio of oxide feed to heavy liquid compounds reduces the tendency of the burden to cluster excessively near the burden stockline. In this prereduction zone, the oxide feed material is reduced to low metallization, i.e. metallization less than 25 percent, by reaction with reductants $H_2$ and CO in the upwardly moving gases. Thus the burden becomes electrically conductive before it leaves the prereduction zone.

The central region of the shaft furnace constitutes a reduction zone in which metallic iron is formed by reaction of the char formed from the carbonaceous fuel with oxygen from the iron oxide. The reactions in the reduction zone are endothermic. The required heat in the reduction zone is supplied electro-thermally. This heat requirement is approximately 700 kWh (0.6 Giga calories) per metric ton of direct reduced iron. Excess heat in the reducing zone will cause the pellets to soften and the burden to become a pasty mass which will tend to prevent upflow of process gas through the burden or to curtail upflow of reducing gas. The circulation of the process gas from bustle 80 through the burden will help in maintaining the burden in solid particulate form until it reaches the melting zone.

The lower region of the furnace constitutes a melting zone wherein the hot reduced pellets are melted prior to discharge. The additional heat requirement to melt the pellets is 200 kWh (about 0.17 Giga calories) per metric ton.

The product discharge from the shaft furnace is molten iron with about three to 12 percent impurities. The iron is converted to steel in an oxygen steelmaking furnace, or it can be used as pig iron.

A small amount, up to five weight percent, of limestone or dolomite may be added to the feed material to react with sulfur which may be liberated within the furnace. This nonmetallic material can be separated from the molten iron product as slag or gangue. An additional amount of limestone or dolomite is added to the feed to fluidize the slag in accordance with normal slagging practice.

As a specific example of the operation of the furnace, calculations have been made regarding the gas flow rates, gas temperatures and gas compositions at a number of locations in the furnace flow diagram. These calculations have been based on an oxide feed analysis of 97 percent $Fe_2O_3$, with three percent gangue materials. Ten percent more coal than is theoretically required, having a proximate analysis of 57.6 percent fixed carbon, 3.3 percent water, 29.0 percent volatiles and 10.1 percent ash was used as a basis for these calculations. This is a high volatile grade A bituminous coal. The tar and oil yield from the coal is about 0.11 cubic meters per metric ton. Tars and oil present in the top gas are 22,000 milligrams per normal cubic meter. The temperature in the reducing zone is 980° C. The metallization of the ultimate product is 92 percent with the metallization taking place in the prereduction zone being 20 percent. The use of excess coal will result in carburizing the iron product.

Table 1 shows computed operating figures for a direct reduction furnace operated in accordance with the invention. The gas analyses are typical operating figures at the locations indicated by the letter headings. These locations are as follows:

A. Top gas upon exit from top gas outlet 44.
B. Gas exiting water-scrubber 60.
C. Gas passing through vent V1.
D. Gas entering furnace inlet 78.
E. Gas leaving the reduction zone, in the region of electrode 30.

Gas flows in the table are given in normal cubic meters per metric ton ($Nm^3/t$) of Product.

TABLE 1

| | A | B | C | D | E |
|---|---|---|---|---|---|
| Flow - ($Nm^3/t$ Prod.) | 1300 | 1260 | 500 | 760 | 1280 |
| Temp. - °C. | 360 | 40 | 40 | 980 | 980 |
| Analysis - | | | | | |
| %CO | 49.1 | 50.7 | 50.7 | 53.9 | 65.6 |
| %$CO_2$ | 23.3 | 24.1 | 24.1 | 20.9 | 8.3 |
| %$H_2$ | 17.0 | 17.6 | 17.6 | 14.4 | 21.0 |
| %$H_2O$ | 9.0 | 6.0 | 6.0 | 9.2 | 4.5 |
| %$CH_4$ | 0.9 | 0.9 | 0.9 | 0.9 | 0.0 |
| %$N_2$ | 0.7 | 0.7 | 0.7 | 0.7 | 0.6 |

Tests have been conducted to determine the electrical resistance at various temperatures of a packed bed burden consisting of 89 percent nominal 12 mm diameter pellets of approximately 90 percent metallization, 10 percent nominal 12 mm diameter coal char from low volatile bitiminous coal and one percent limestone of nominal six mm diameter. In table 2 the resistivity represents the resistance through a burden having a face area one meter square and a resistance path depth of one meter. The table represents points taken from a curve of plotted data points:

TABLE 2

| Temperature | Resistivity in Ohm-Meters |
|---|---|
| 100° C. | .0055 |
| 300° C. | .0033 |
| 500° C. | .0020 |
| 700° C. | .0012 |
| 900° C. | .0007 |

The preferred reduction temperature in the furnace of the present invention is in the range of 900° to 1000° C. The burden resistivity in this temperature range at either low or high metallization requires relatively high current at relatively low voltage which makes practical the resistance heating of the burden without need for sophisticated electrical insulation or grounding means.

SUMMARY OF THE ACHIEVEMENTS OF THE OBJECTS OF THE INVENTION

It is clear from the above that we have invented a method for directly reducing iron oxide to molten iron in a shaft type reduction furnace utilizing solid fuel as the reductant source in which energy input requirements are greatly reduced over present commercial direct reduction plants and with more efficient operation than was heretofore possible.

It is to be understood that the foregoing description and specific example are merely illustrative of the principles of the invention and that various modifications and additions may be made thereto by those skilled in the art without departing from the spirit and scope of the invention as set forth in the following claims:

What is claimed is:
1. A method of reducing particulate iron oxide material to molten iron with a solid reductant comprising:
   (a) continously feeding particulate iron oxide and solid particulate carbonaceous fuel to a particle inlet at the top of a shaft furnace to establish a packed burden therein;
   (b) passing an electric current through the burden to provide sufficient heat by electric resistance heating to react said carbonaceous fuel with oxygen from said particulate iron oxide to reduce said iron oxide substantially to metallic iron and to melt the iron and form a molten iron pool;
   (c) causing the reaction products to move through said particulate burden in counterflow relation with it, and form a top gas;
   (d) removing top gas from the upper region of the shaft furnace;
   (e) cooling said top gas;
   (f) preheating the cooled top gas;
   (g) recirculating the heated gas to the burden through a gas inlet at the lower region of said furnace above said molten metal pool; and
   (h) removing molten iron product and slag from an outlet at the bottom of said furnace.
2. A method according to claim 1 wherein said particulate carbonaceous fuel is coal.
3. A method according to claim 1 wherein said particulate carbonaceous fuel is lignite.
4. A method according to claim 1 wherein said particulate carbonaceous fuel is coke.
5. A method according to claim 1 further comprising adding limestone, dolomite, or a mixture thereof to said feed material.
6. A method according to claim 1 further comprising cleaning said removed top gas in a scrubber, and returning the scrubber underflow to the interior of said furnace beneath the stock line of said burden.
7. A method according to claim 6 further comprising injecting a portion of the cleaned top gas into the scrubber underflow to assist in returning the underflow to said furnace.

* * * * *